Patented Feb. 23, 1932

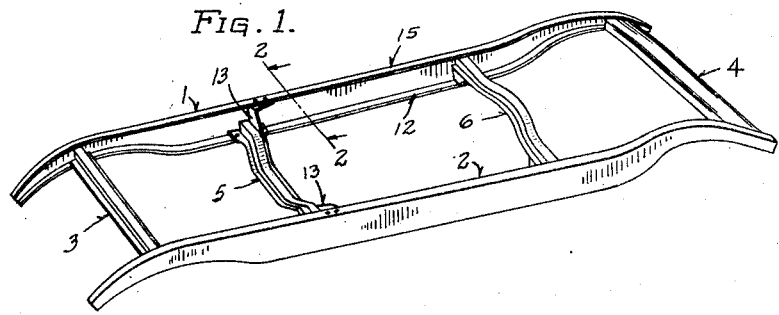
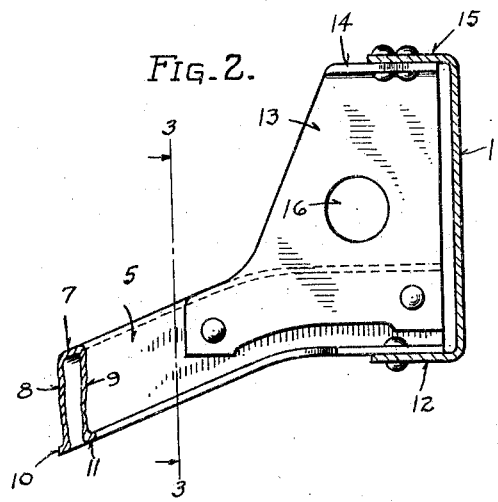
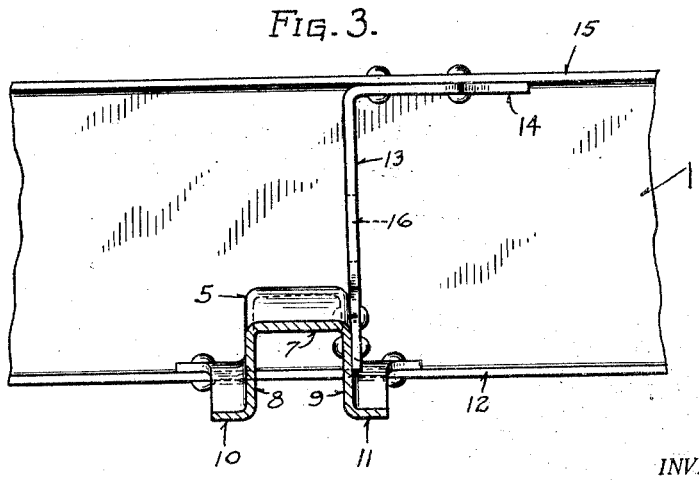

1,846,464

UNITED STATES PATENT OFFICE

BIRGER T. ANDREN, OF MILWAUKEE, WISCONSIN, ASSIGNOR TO A. O. SMITH CORPORATION, OF MILWAUKEE, WISCONSIN, A CORPORATION OF NEW YORK

AUTOMOBILE FRAME

Application filed May 2, 1930. Serial No. 449,237.

This invention relates to an automobile frame and has particular reference to a recent development of sheet metal cross bar and side bar construction and fabrication.

The object of the invention is to provide an automobile frame with improved more rigid construction and which may be more readily and economically manufactured.

Other objects will appear hereinafter with reference to the preferred form of the invention as illustrated in the accompanying drawings.

In the drawings:

Figure 1 is a perspective view of the frame.

Fig. 2 is a transverse section on line 2—2 of Fig. 1.

Fig. 3 is a section on line 3—3 of Fig. 2.

The automobile frame as preferably constructed has two opposed channel side bars 1 and 2 and front and rear cross bars 3 and 4, respectively, connecting said side bars.

The front cross bar 3 provides a support for the front end of an automobile engine and a rear engine support is provided by an intermediate cross bar 5.

The rear cross bar 4 provides a support for the automobile body at the rear end.

An auxiliary strengthening cross bar 6 may be employed intermediate the rear cross bar 4 and the engine supporting cross bar 5 and positioned adjacent the forward hangers for the rear automobile spring.

The present invention is particularly related to the construction and attachment of the engine supporting cross bar 5, although the invention in its broad aspect may be applied to the construction of any of the cross bars, as well.

The cross bar 5 preferably comprises an inverted channel member having a channel bottom 7 extending horizontally in transverse section and flanges 8 and 9 on either side extending vertically downwardly. The cross bar also has horizontal webs 10 and 11 projecting laterally from the lower edge of the flanges 8 and 9, respectively, and extending for the full length of the bar.

The cross bar is of U-shape longitudinally so that it will pass under the engine casing. The webs 10 and 11 are attached at each end to the lower flange 12 of the side bars 1 and 2.

A flat sheet metal plate 13 is attached to one flange of the cross bar at each end of the bar and extends upwardly in a vertical plane between the flanges of and transverse to the side bars. The upper end of each plate 13 is bent horizontally to form a gusset 14 which is attached to the upper flange 15 of the side bar. The plate 13 thus acts as a brace between the cross bar and side bar and also as a reenforcement for the side bar itself. The plates have central openings 16 for the passage of electric cables or other parts.

The several parts of the frame are preferably riveted together although they may be secured by welding.

Various modifications of the invention may be employed within the scope of the following claims.

I claim:

1. In an automobile frame, a side bar having upper and lower flanges, a sheet metal cross bar having webs projecting laterally from the flanges thereof and attached to the lower flange of said side bar at one end of said cross bar, and a plate attached to one flange of said cross bar at the end thereof and extending upwardly in a vertical plane between the flanges of and transverse to said side bar, the upper end of said plate being bent horizontally to form a gusset for attachment to the upper flange of said side bar.

2. In an automobile frame, two opposing channel side bars having upper and lower flanges, a sheet metal cross bar of channel shape having webs extending laterally from the flanges thereof throughout the length of said cross bar, said webs being attached to the lower flanges of said side bars and said cross bar being of substantial U-shape in its length, and plates disposed between the flanges of the side bars and connecting said cross bar to the upper flanges of said side bars.

3. In an automobile frame, two opposing channel side bars, a sheet metal cross bar of channel shape having webs extending laterally from the edges of the flanges thereof, said webs and said flanges extending throughout the length of said cross bar, and a plate attached to one flange of said cross bar at each end thereof and to the upper flange of the corresponding side bar, said cross bar being of substantially U-shape in the length thereof to provide a low central support for the engine of the automobile.

4. In an automobile frame, two opposing channel side bars, a sheet metal cross bar of channel shape throughout its entire length and having laterally projecting webs extending substantially the full length of said cross bar, said cross bar being attached at its opposite ends to one flange of each of said side bars, and a brace connecting each end of said cross bar to the other flange of each respective side bar.

5. In an automobile frame, two opposing channel side bars, a sheet metal cross bar of channel shape throughout its entire length and having laterally projecting webs extending substantially the full length of said cross bar and attached at their ends to one flange of each of said side bars, and a sheet metal brace connecting said cross bar at each end to the other flange of each respective side bar.

In witness whereof I have hereunto subscribed my name at Milwaukee, Wisconsin, this 29th day of April, 1930.

BIRGER T. ANDREN.